United States Patent Office 2,921,075
Patented Jan. 12, 1960

2,921,075

CARBAMIDOMETHYL QUATERNARY SALTS OF TROPINE

Seymour L. Shapiro, Hastings on Hudson, Louis Freedman, Bronxville, and Harold Soloway, Yonkers, N.Y., assignors to U. S. Vitamin & Pharmaceutical Corporation, a corporation of Delaware No Drawing. Application November 26, 1958
Serial No. 776,424

5 Claims. (Cl. 260—292)

This invention relates to carbamidomethyl and N-substituted carbamidomethyl mono-quaternary salts of tropine.

Specifically, the compounds of this invention may be represented by tropine quaternaries of the following formula

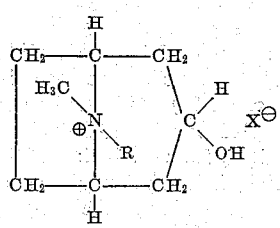

wherein R is a carbamidomethyl, and N-substituted carbamidomethyl group, and X is a non-toxic anion.

We have now found that within certain structural limitations, critical variations of the quaternizing structure R yield water-soluble, non-hygroscopic compounds which are readily isolated, stable, crystalline solids and which have utility as hypotensive agents.

The quaternizing element R is more specifically defined by the following.

$$-CH_2-\overset{O}{\overset{\|}{C}}-\overset{R_2}{\overset{|}{N}}-R_1$$

wherein $R_1$ is selected from the group consisting of hydrogen, alkyl, cycloalkyl, cycloalkylalkyl, aryl, substituted aryl, arylalkyl and substituted arylalkyl, said carbon-containing groups having a carbon content of $C_1-C_{10}$, and said substituents being selected from the group consisting of lower alkyl, alkoxy, halogen and hydroxy, and $R_2$ is selected from the group consisting of hydrogen and lower alkyl.

In the course of our investigation we have found that in order to afford good hypotensive activity, $R_2$ is desirably hydrogen, and that the following limitations in the structure of $R_1$ apply.

$R_1$ is hydrogen, or m- or p-substituted phenyl, and arylalkyl. In those instances wherein $R_1$ is arylalkyl, a methylene unit, (—$CH_2$—), separates the nitrogen atom from the remainder of the group. If, in turn, in the arylalkyl series the carbon attached to the nitrogen bears an iso group as —$CH(CH_3)$—, the resultant compound is not effective as a hypotensive agent.

These distinctions will be rendered more apparent from the detailed discussion of the structural variation vs. hypotensive response which follows below.

The compounds of this invention are readily prepared from tropine and the suitably N-substituted chloroacetamide or bromoacetamide by dissolving equimolar amounts of the two components in an organic solvent such as acetonitrile, ethanol, butanol, nitromethane and the like. The reaction occurs on standing at 20–30° C. for 3–7 days or upon heating under reflux for 2–24 hours. The formed quaternary salt either crystallizes from the reaction mixture, or can be recovered from the reaction mixture by addition of a non-polar solvent such as ether or benzene. Alternatively, the solvent of the reaction mixture can be evaporated and the residue of the product purified by recrystallization.

The initial reactants employed include tropine which is commercially available, and the N-substituted chloroacetamides or bromoacetamides. These amides are readily prepared from the amine $R_1R_2NH$ by reaction with chloroacetyl chloride or bromoacetyl bromide.

The following preparation and examples are illustrative of the compositions and processes of this invention but are not to be construed as limiting.

EXAMPLE 1

Typical of the N-substituted haloacetamides required as initial reactants is the preparation of N-(2-[1,4-endomethylene]cyclohexyl)methyl-α-bromoacetamide.

A solution of 18.2 g. (0.15 mole) of (2-[1,4-endomethylene]cyclohexyl)methylamine in 100 ml. of acetonitrile was cooled to —10° C. and a solution of 15.1 g. (0.075 mole) of bromoacetyl bromide in 25 ml. of acetonitrile was added with continued chilling and stirring. After 3 hours at 20° C. the formed amine hydrobromide was separated, the filtrate concentrated under reduced pressure and the residue of product distilled. There was obtained 9.0 g. of product boiling at 104–130° (0.04 mm.).

In a similar fashion the following $R_1R_2NCOCH_2X$ were obtained:

| $R_1$ | $R_2$ | X | M.P., °C. or B.P., °C. (mm. Pressure) |
|---|---|---|---|
| $CH_3$— | $CH_3$— | Br | 94– 96 (3.5) |
| —$(CH_2)_4$— | | Br | 138–140 (5) |
| n—$C_5H_{11}$— | H | Cl | 100–102 (2.7) |
| $C_6H_5CH_2$— | H | Cl | 93– 95 |
| $C_6H_5CH_2$— | $CH_3$— | Cl | 104 (0.06) |
| $C_6H_5CH_2$— | i—$C_3H_7$— | Br | 124–136 (0.2) |
| $C_6H_5CHCH_3$— | H | Br | 82– 83 |
| $C_6H_5CH_2CHCH_3$— | H | Cl | 49– 50 |
| 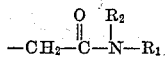 | H | Br | 104–130 (0.04) |
| $C_6H_5$— | H | Cl | 133–134 |
| p—Cl—$C_6H_5$— | H | Cl | 164–166 |
| $C_6H_5$— | $CH_3$— | Cl | 69– 70 |

In a similar fashion using ethylamine, butylamine, isobutylamine, β-phenethylamine, anisidine, p-toluidine, m- bromoaniline, phenetidine and the like, the corresponding chloroacetamides are prepared.

Example 2

N-(carbamidomethyl)tropinium chloride

A solution of 4.2 g. (0.03 mole) of tropine, 5.6 g. (0.06 mole) of α-chloroacetamide and 60 ml. of acetonitrile was maintained at 20° C. for 5 days. Filtration yielded 4.7 g. of product, M.P. 232-237° C. An additional 1.4 g. was obtained by addition of ether to the filtrate. Recrystallization of the combined products from ethanol gave 3.9 g. (58%), melting at 258-260° C.

*Analysis.*—Calcd. for $C_{10}H_{19}ClN_2O_2$: C, 51.2; H, 8.2; N, 11.9. Found: C, 51.2; H, 8.1; N, 11.8.

EXAMPLE 3

N-(N'-benzylcarbamidomethyl)tropinium chloride

Prepared as in Example 2 from 1.4 g. (0.01 mole) of tropine, 1.8 g. (0.01 mole) of α-chloro-N-benzylacetamide and 20 ml. of acetonitrile. The product (2.0 g., 62%) melting at 187-190° C. was recrystallized from acetonitrile to give 1.0 g. (32%), M.P. 196-197°C.

*Analysis.*—Calcd. for $C_{17}H_{25}ClN_2O_2$: C, 62.9; H, 7.8; N, 8.6. Found: C, 62.8; H, 7.7; N, 8.7.

In a similar manner, N-(N'-[p-chlorobenzyl]carbamidomethyl)tropinium chloride is prepared.

EXAMPLE 4

N-(N'-[p-chlorophenyl]carbamidomethyl)tropinium chloride

Prepared as in Example 2 from 1.4 g. (0.01 mole) of tropine, 2.0 g. (0.01 mole) of α,p-dichloroacetanilide and 50 ml. of acetonitrile. Trituration of the reaction mixture with ether gave 2.0 g. (59%) of product, M.P. 220-227° C. Recrystallization from isopropanol yielded 1.5 g., melting at 247-248° C.

*Analysis.*—Calcd. for $C_{12}H_{22}Cl_2H_2O_2$: C, 55.7; H, 6.4; N, 8.1. Found: C, 56.0; H, 6.4; N, 7.9.

In a similar manner, N-(N'-phenylcarbamidomethyl)tropinium chloride, N-(N'[m-bromophenyl]carbamidomethyl)tropinium chloride and N-(N'-[p-methoxyphenyl]carbamidomethyl)tropinium chloride are parepared.

EXAMPLE 5

N-(N'-n-pentylcarbamidomethyl)tropinium chloride

Prepared as in Example 2 from 2.8 g. (0.017 mole) of N-n-pentyl-α-chloroacetamide, 2.4 g. (0.017 mole) of tropine and 30 ml. of acetonitrile. After standing 4 days, the solution was refluxed for 10 hours, then cooled, the solvent removed at diminished pressure and the product (3.8 g., 73%) melting at 155-160° C. was recrystallized from hexane to give 1.1 g. (33%), M.P. 183-184° C.

*Analysis.*—Calcd. for $C_{15}H_{29}ClN_2O_2$: C, 59.1; H, 9.6; N, 9.2. Found: C, 59.2; H, 9.1; N, 9.6.

EXAMPLE 6

N-([2-diethylammonium]ethyl)tropinium dichloride

Tropine (2.8 g., 0.02 mole), 3.4 g. (0.02 mole) of 2-diethylaminoethyl chloride hydrochloride and 50 ml. of acetonitrile were refluxed together for 5 hours. On cooling and filtration, 2.1 g. of solid were obtained, M.P. 233-235° C., which on recrystallization from ethanol gave 0.7 g. (32%), which did not melt at 300° C.

*Analysis.*—Calcd. for $C_{14}H_{30}Cl_2N_2O$: C, 53.7; H, 9.7; N, 8.9. Found: C, 53.4; H, 10.4; N, 9.2.

A more detailed description of the properties of this invention, and the relation of their structure to the hypotensive response is given in Table I.

TABLE I.—PHYSICAL AND PHARMACOLOGICAL PROPERTIES OF COMPOUNDS

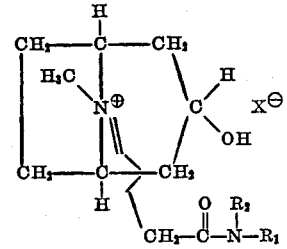

| No. | $R_1$ | $R_2$ | X | M.P., °C. | $LD_{min.}$[a] | Hyoptensive Response[b] |
|---|---|---|---|---|---|---|
| 1 | H | H | Cl | 258-260 | 400 | 3+ |
| 2 | $C_6H_5CH_2$— | H | Cl | 196-197 | 500 | 3+ |
| 3 | $C_6H_5$— | H | Cl | 175-178 | 750 | 3+ |
| 4 | p—Cl—$C_6H_4$— | H | Cl | 247-248 | 350 | 3+ |
| 5 | $CH_3$— | $CH_3$— | Br | 242-243 | 750 | 0 |
| 6 | n—$C_5H_{11}$— | H | Cl | 183-184 | 500 | 0 |
| 7 | —$(CH_2)_4$— |  | Br | 241 | 1,000 | 0 |
| 8 | ⌬—$CH_2$— | H | Br | 246-248 | 400 | 0 |
| 9 | $C_6H_5CH(CH_3)$— | H | Br | 198-199 | 750 | 0 |
| 10 | $C_6H_5CH_2$— | $CH_3$— | Cl | 103-104 | 450 | 0 |
| 11 | $C_6H_5CH_2$— | i—$C_3H_7$— | Br | 169-172 | 250 | 0 |

NOTE. Footnotes at end of table.

TABLE I—Continued
COMPOUNDS PREPARED FOR COMPARISON

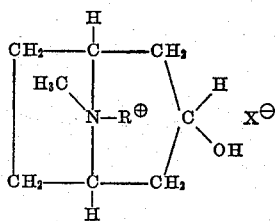

| No. | R | X | M.P., °C. | LD$_{min.}$[a] | Hypotensive Response[b] |
|---|---|---|---|---|---|
| 12 | n—C$_{12}$H$_{25}$— | Br | 211–213 | 100 | 0 |
| 13 | ⟨cyclohexyl⟩—CH$_2$CH$_2$— (cyclohexylethyl) | Br | 182–185 | 100 | 1+ |
| 14 | HCl.(C$_2$H$_5$)$_2$NCH$_2$CH$_2$— | Cl | 300 | 400 | 1+ |
| 15 | Hexamethonium [c] | | | | 3+ |

[a] The LD$_{min.}$ is the minimum dose of the compound administered subcutaneously, expressed in milligrams per kilogram, which was lethal to mice.

[b] The hypotensive activities were established by intravenous administration of the compounds to anesthetized (nembutal, 30 mg./kg.) dogs at dosage levels corresponding to 1/100 LD$_{min.}$ as established in mice. In no instance was a dosage higher than 5 mg./kg. used. The blood pressure response has been classified as 3+ equals sustained and marked hypotension (20 mm. or more); 2+ equals sustained and moderate hypotension (5–20 mm.); 1+ equals transient hypotension; and 0 equals no response noted.

[c] Hexamethonium is (CH$_3$)$_3$—$\overset{\oplus}{\text{N}}$—(CH$_2$)$_6$—$\overset{\oplus}{\text{N}}$(CH$_3$)$_3$.2Cl$^{\ominus}$ and is a clinically used hypotensive agent.

It is noted that a profound hypotensive response is obtained with the compounds fulfilling the structural requisites of this invention (see compounds 1–4).

Alternatively, when R$_2$ is other than hydrogen, substantially no hypotensive activity is obtained (see compounds 5, 8, 10 and 11), or when the carbon atom adjoining the nitrogen is substituted (see compound 9) the hypotensive effect is reduced or disappears.

Alternatively, a variety of structures which do not bear the carbamidomethyl group, but are of the same molecular size as typical substituents of this invention, fail to give a response (see compounds 12–14).

The novel compounds of this invention can be combined with solid or liquid pharmaceutical carriers and formulated into the form of tablets, powder packets or capsules; or, dissolved in suitable solvents for oral or parenteral administration for human or veterinary use.

It is to be understood that it is intended to cover all changes and modifications of the examples of the invention herein chosen for the purpose of illustration which do not constitute departure from the spirit and scope of the invention.

We claim:

1. The N-substituted carbamidomethyl quaternary salt of tropine of the following structure

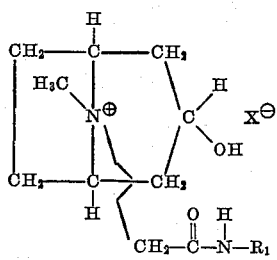

where R$_1$ is selected from the group consisting of hydrogen, phenyl, p-chlorophenyl and benzyl and X is selected from the group consisting of bromine and chlorine.

2. The compound of claim 1 where R$_1$ is hydrogen and X is chlorine.

3. The compound of claim 1 where R$_1$ is benzyl and X is chlorine.

4. The compound of claim 1 where R$_1$ is phenyl and X is chlorine.

5. The compound of claim 1 where R$_1$ is p-chlorophenyl and X is chlorine.

No references cited.

UNITED STATES PATENT OFFICE
Certificate

Patent No. 2,921,075                                                    Patented January 12, 1960

Seymour L. Shapiro, Louis Freedman and Harold Soloway

Application having been made jointly by Seymour L. Shapiro, Louis Freedman and Harold Soloway, the inventors named in the above identified patent; and U.S. Vitamin & Pharmaceutical Corporation, New York, N.Y., a corporation of Delaware, the assignee of record, for the issuance of a certificate under the provisions of Title 35, Section 256 of the United States Code, deleting the name of the said Harold Soloway as a joint inventor, and a showing and proof of facts satisfying the requirements of the said section having been submitted, it is this 15th day of March 1966, certified that the name of the said Harold Soloway is hereby deleted from the said patent as a joint inventor with the said Seymour L. Shapiro and Louis Freedman.

[SEAL]

EDWIN L. REYNOLDS,
                                                   *First Assistant Commissioner of Patents.*